United States Patent
Hidaka et al.

(10) Patent No.: US 9,787,150 B2
(45) Date of Patent: Oct. 10, 2017

(54) ROTOR OF BRUSHLESS MOTOR

(71) Applicant: DENSO CORPORATION, Kariya, Aichi-pref. (JP)

(72) Inventors: Yuuji Hidaka, Chiryu (JP); Kiyoshi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 334 days.

(21) Appl. No.: 14/471,873

(22) Filed: Aug. 28, 2014

(65) Prior Publication Data

US 2015/0061446 A1    Mar. 5, 2015

(30) Foreign Application Priority Data

Aug. 30, 2013    (JP) .................................. 2013-179663

(51) Int. Cl.
*H02K 1/27* (2006.01)
*H02K 1/28* (2006.01)
*H02K 15/03* (2006.01)

(52) U.S. Cl.
CPC ............. *H02K 1/2733* (2013.01); *H02K 1/28* (2013.01); *H02K 15/03* (2013.01); *H02K 2213/03* (2013.01)

(58) Field of Classification Search
CPC ............ H02K 1/27; H02K 15/03; H02K 1/30; H02K 1/28; H02K 21/16; H02K 7/14
IPC ................. H02K 1/27,15/03, 1/30, 1/28, 21/16, H02K 7/14
See application file for complete search history.

(56) References Cited

U.S. PATENT DOCUMENTS

| | | | |
|---|---|---|---|
| 6,765,319 B1 * | 7/2004 | Thompson | H01F 1/0578 310/156.08 |
| 8,299,661 B2 * | 10/2012 | Jeung | H02K 1/2733 310/156.08 |
| 8,436,497 B2 * | 5/2013 | Horng | H02K 1/28 310/156.08 |
| 2007/0052310 A1 * | 3/2007 | Sakai | F02M 37/048 310/87 |
| 2007/0065315 A1 | 3/2007 | Nagata et al. | |
| 2008/0054736 A1 * | 3/2008 | Miyata | H02K 1/02 310/44 |
| 2009/0195102 A1 * | 8/2009 | Shibui | H02K 1/2733 310/156.28 |

FOREIGN PATENT DOCUMENTS

| | | |
|---|---|---|
| JP | 2012-139070 | 7/2012 |
| JP | 2013-017303 | 1/2013 |

OTHER PUBLICATIONS

Office Action (3 pages) dated Jul. 21, 2015, issued in corresponding Japanese Application No. 2013-179663 and English translation (4 pages).

* cited by examiner

*Primary Examiner* — Hanh Nguyen
*Assistant Examiner* — Leda Pham
(74) *Attorney, Agent, or Firm* — Nixon & Vanderhye P.C.

(57) ABSTRACT

A rotor of a brushless motor used in a fuel pump includes a permanent magnet having first and second ends that are configured to have a thickness ratio so that a degree of margin of those ends, which is a difference between an allowable stress and a temperature stress due to expansion and contraction of a rotor core caused by a temperature change is equal to or greater than a preset value. As a result, a cracking of the permanent magnet on the both ends that is caused by repeated expansions and contractions of the rotor core is prevented.

20 Claims, 9 Drawing Sheets

_(54) ROTOR OF BRUSHLESS MOTOR_

CROSS REFERENCE TO RELATED APPLICATION

The present application is based on and claims the benefit of priority of Japanese Patent Application No. 2013-179663, filed on Aug. 30, 2013, the disclosure of which is incorporated herein by reference.

TECHNICAL FIELD

The present disclosure generally relates to a rotor of a brushless motor that is used in a fuel pump.

BACKGROUND INFORMATION

Generally, a fuel pump has an impeller rotatably disposed in a pump room and a motor that rotatably drives the impeller. Such a fuel pump may be used for suctioning a fuel from a fuel tank and for transferring the fuel to an internal-combustion engine. For example, a brushless motor is used for a fuel pump that is disclosed in a patent document 1 (i.e., Japanese Patent Laid-Open No. JP-A-2013-17303). A rotor core of a rotor of this brushless motor includes an inner core that is engagingly fixed onto a shaft by fitting and a permanent magnet that is disposed on an outside of the inner core. The permanent magnet has a cylinder part and tabular ends located on both ends of the cylinder part. Thus, the amount of the permanent magnet used in the core is reduced as a result of the inner core.

The permanent magnet in the above configuration is provided as a bonded magnet which is formed by injection molding a mixture of material including resin and magnetic particles. The bonded magnet disposed on the inner core is attached on an outer surface of the inner core. Further, a difference between a coefficient of a linear expansion of the resin that is used in the bonded magnet and that of a metal inner core may cause a crack in the permanent magnet over time. The cracking may be the result of repeated expansion and contraction of the rotor core due to the temperature change.

SUMMARY

It is an object of the present disclosure to provide a rotor for a brushless motor that is used in a fuel pump, which prevents cracking of the permanent magnet.

In order to achieve the above-mentioned goal, based on a result of repeated studies and the like, the inventors of the present disclosure have found out that a stress is specifically applied to both ends of the permanent magnet, when the rotor core is exposed to a temperature change, which causes expansion and contraction of the rotor core. Further, when a difference between (i) an allowable stress of an end of the permanent magnet and (ii) a stress applied to the end due to the expansion and contraction is defined as "a degree of margin", the inventors have found out a specific shape of the permanent magnet which makes the above-mentioned degree of margin relatively large. The present disclosure is based on such knowledge.

In an aspect of the present disclosure, a rotor of a brushless motor by the present disclosure is used in a brushless motor which rotates an impeller of a fuel pump, and is provided with a shaft, an inner core, and a permanent magnet. The inner core is being fixed onto the shaft in an engaging manner. The permanent magnet includes a cylinder part (61) that is positioned radially outside of the inner core, a first end (62) that has a tabular shape and is located on one axial end relative to the cylinder part and the inner core, and a second end (63) that has a tabular shape and is located on an other axial end relative to the cylinder part and the inner core. The permanent magnet has plural magnetic poles arranged around a circumference of the permanent magnet.

When a full length of the permanent magnet along an axial direction is defined as "a" and a thickness of the first end of the permanent magnet along the axial direction is defined as "b", the permanent magnet is made by die forming to satisfy a condition $0.1 \leq (b/a) \leq 0.17$.

Such a configuration enables a relatively large degree of margin. Therefore, the permanent magnet formed in such manner is prevented to suffer from a crack, even when repeated expansions and contractions are caused on the rotor core due to the temperature change.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

(One embodiment)

Figure 1:
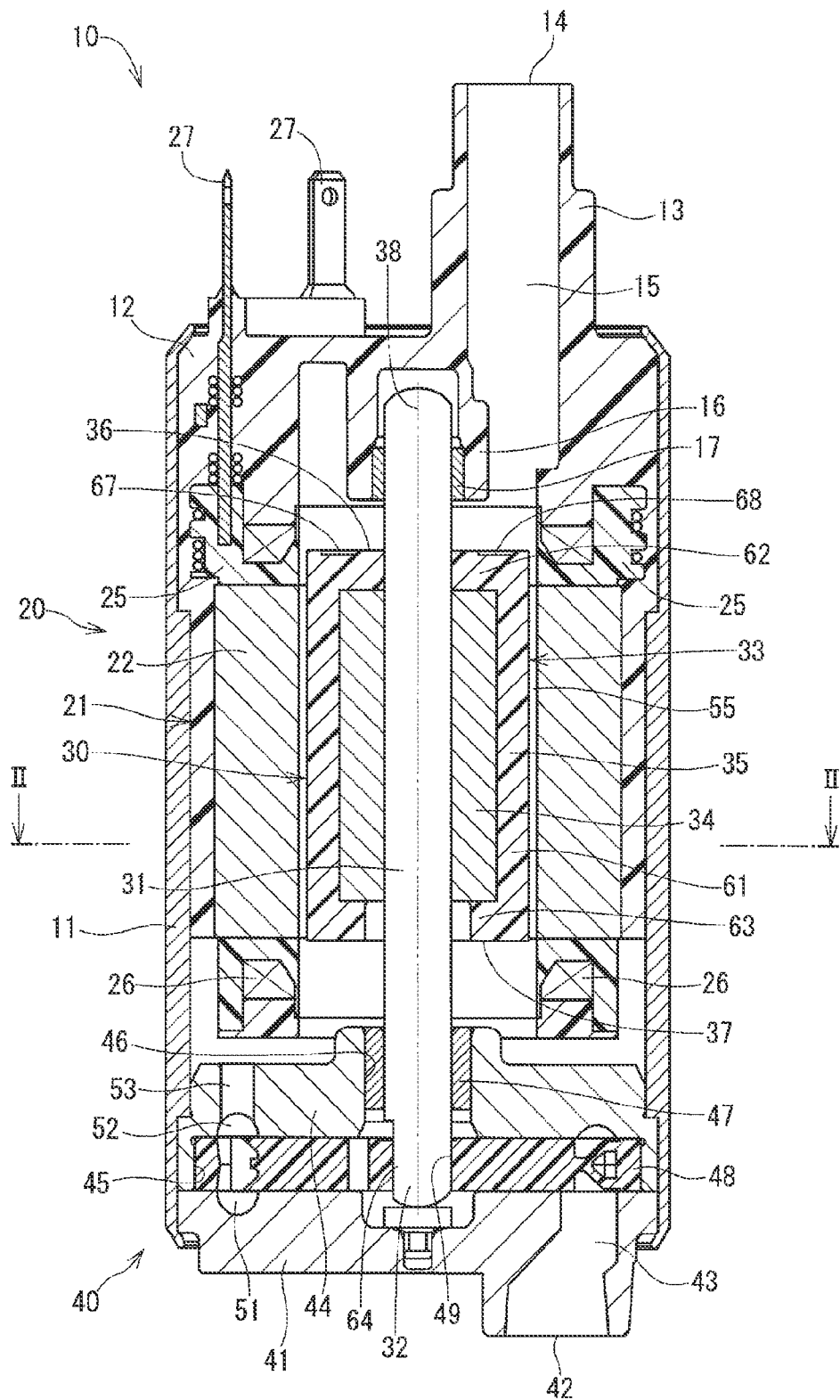
FIG. 1 is a longitudinal cross section of a fuel pump to which a rotor in one embodiment of the present disclosure is applied.

The rotor in one embodiment of the present disclosure is applied to a fuel pump shown in FIG. 1. A fuel pump 10 is an in-tank type pump installed in a fuel tank which is not illustrated, suctions a fuel from the fuel tank through a suction hole 42 shown in a lower part of FIG. 1, and discharges the fuel to an internal-combustion engine through a discharge hole 14 shown in an upper part of FIG. 1.

Figure 2:
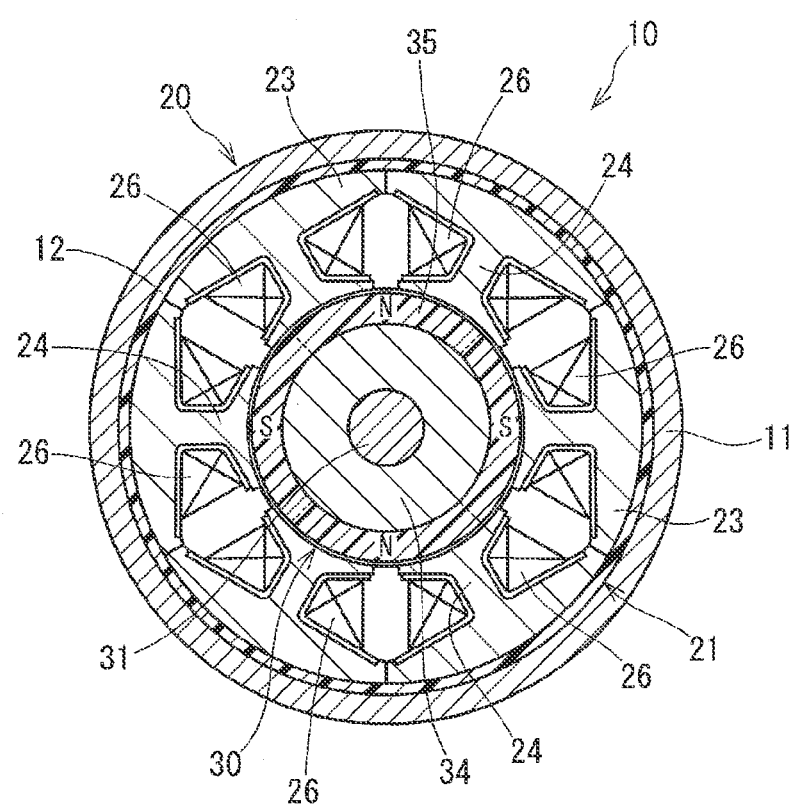
FIG. 2 is a II-II line cross section of FIG. 1.

First, an entire configuration of the fuel pump 10 is described with reference to FIGS. 1 and 2.

The fuel pump 10 is divided roughly into two parts, that is, a motor part 20 and a pump part 40, and its outer shell comprises a housing 11, a pump cover 41, a cover end 12 and the like. In the following description, the upper part of FIG.

1 is described as a "discharge hole 14 side", and the lower part of FIG. 1 is described as a "suction hole 42 side".

(Outer Shell)

The housing 11 is formed in a cylindrical shape.

The pump cover 41 covers a suction hole 42 side end of the housing 11, and, by caulking an edge of the housing 11 inwardly, the pump cover 41 is fixed thereon.

The cover end 12 covers a discharge hole 14 side end of the housing 11, and, by caulking an edge of the housing 11 inwardly, the cover end 12 is fixed thereon.

A cylinder part 13 which projects upward in FIG. 1 is formed on an outside of the cover end 12. On an end of the cylinder part 13, the discharge hole 14 is opened, and a discharge passage 15 which is open for free passage to the discharge hole 14 is formed on an inside of the cylinder part 13. On an inside of the cover end 12, a cylinder part 16 which projects downward in FIG. 1 is formed. On an inside the cylinder part 16, a bearing 17 is fitted.

(Motor Part)

The motor part 20 is equivalent to a "brushless motor" given in the claims, and is provided with a stator 21 and a rotor 30.

The stator 21 is accommodated in an inside of the housing 11 and has a stator core 22, an insulator 25, a winding 26, and a terminal 27.

The stator core 22 is made of a magnetic material and forms a cylindrical yoke 23 and plural teeth 24 projecting from the yoke 23 toward a radially inward side. The winding 26 is wound around the teeth 24 with the insulator 25. In the present embodiment, the winding 26 includes a U phase winding part, a V phase winding part, and a W phase winding part, and is connectable to an external control device through three terminals 27. The insulator 25 is resin-molded after the winding of the winding 26, to have one body together with the cover end 12.

The rotor 30 is rotatably accommodated in an inside of the stator 21, and has a shaft 31 and a rotor core 33.

The shaft 31 is made of metal and is supported by the bearing 17 and a bearing 47 to be mentioned below. An axial end part 32 of the shaft 31 has a D shape in a horizontal cross sectional view, which means one side of the shaft 31 is cut out. The rotor core 33 has a cylindrical shape, and is fixedly fitted onto the shaft 31. In the present embodiment, the rotor core 33 comprises an inner core 34 that is press-fitted on the shaft 31 and a permanent magnet 35 formed on an outside of the inner core 34. The permanent magnet 35 has plural magnetic poles arranged along the circumference thereof.

The motor part 20 configured in the above-described manner generates a rotating magnetic field when an electric current flows in each of the windings 26 of the stator 21 in different phases, and rotates the rotor 30.

(Pump Part)

The pump part 40 is provided with a pump cover 41, a pump case 44, and an impeller 48.

The pump cover 41 serves as an outer shell of the fuel pump 10, and also serves as a part of the pump part 40. On a lower part of the pump cover 41, the suction hole 42 is opened, and a suction passage 43 which is open for free passage to the suction hole 42 is formed on an inside of the pump cover 41.

The pump case 44 is a cylinder having a bottom, and is disposed at a position between the pump cover 41 and the stator 21, and defines a pump room 45 in a space between itself and the pump cover 41. At a center part of the pump case 44, a piercing hole 46 which pierces through the pump case 44 in a board thickness direction is formed. In this piercing hole 46, the bearing 47 is fittingly inserted.

The impeller 48 is a disk shape bladed wheel made of resin, and is accommodated in the pump room 45. At a center part of the impeller 48, a piercing hole 49 which pierces through the impeller 48 in a board thickness direction is formed. The piercing hole 49 is formed in a D shape, which corresponds to the D shape axial end part 32 of the shaft 31. The impeller 48 is connected with the shaft 31 in a rotatable manner, by an engagement of the axial end part 32 of the shaft 31 into the piercing hole 49.

On a wall part of the pump cover 41 close to the impeller 48, a circumferential groove 51 connected to the suction passage 43 is formed. Further, on a wall part of the pump case 44 close to the impeller 48, a circumferential groove 52 is formed in the wall by the side of the impeller 48 among the pump case 44. In an inside of the pump case 44, a passage 53 that pierces through the circumferential groove 52 and the pump case 44 in a board thickness direction is formed.

The pump part 40 configured in the above-described manner guides the fuel from the fuel tank via the suction hole 42 to the circumferential groove 51, when the impeller 48 is driven in a rotating manner by the motor part 20. The fuel guided into the circumferential groove 51 is further guided into the circumferential groove 52 with its pressure raised by the rotation of the impeller 48. The pressure-raised fuel is then guided to the discharge passage 15 via the passage 53 and a fuel path 55 between the rotor 30 and the stator 21, and is discharged from the discharge hole 14.

Next, a feature configuration of the rotor 30 is described with reference to FIGS. 3-10.

(Permanent Magnet)

Figure 3:
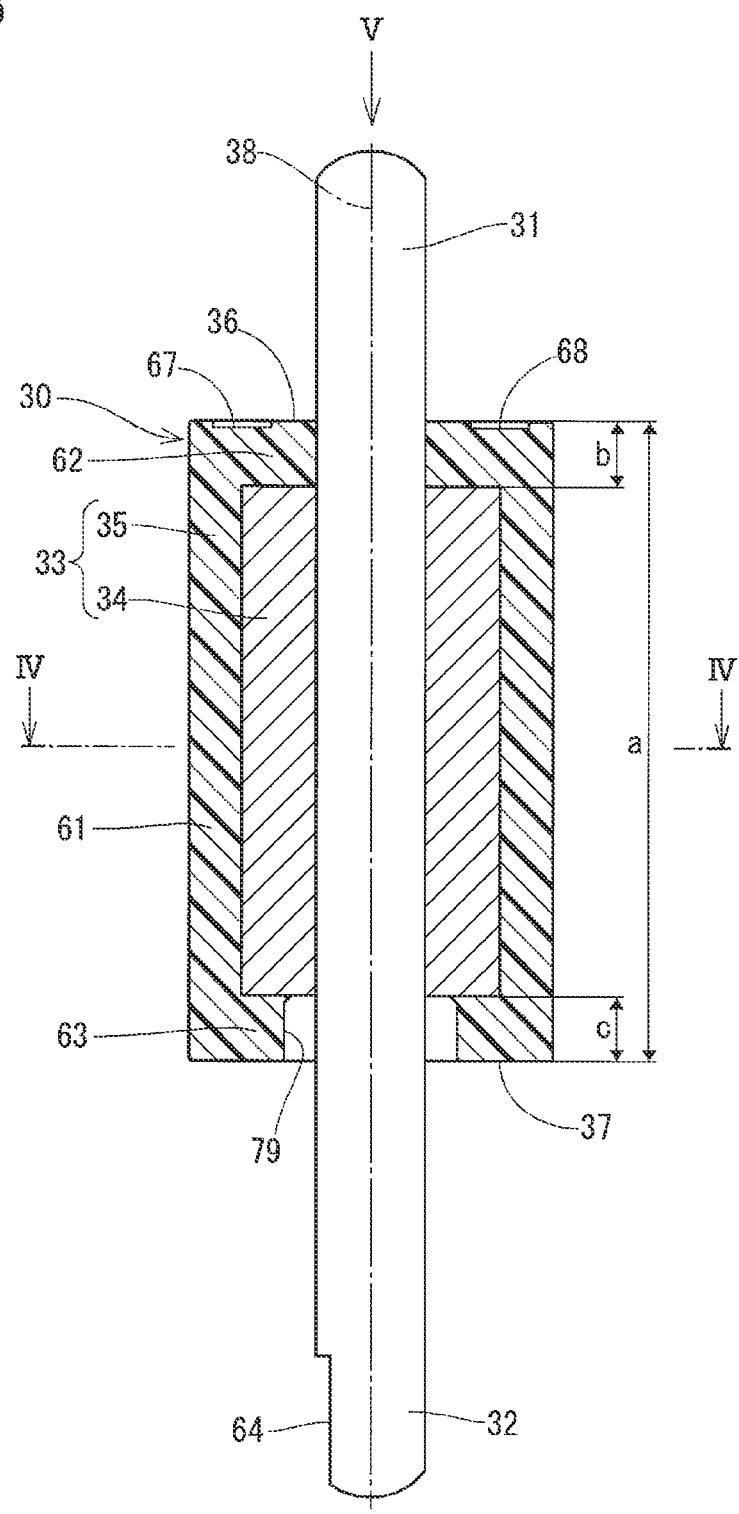
FIG. 3 is a radial cross section of the rotor of FIG. 1.
Figure 4:
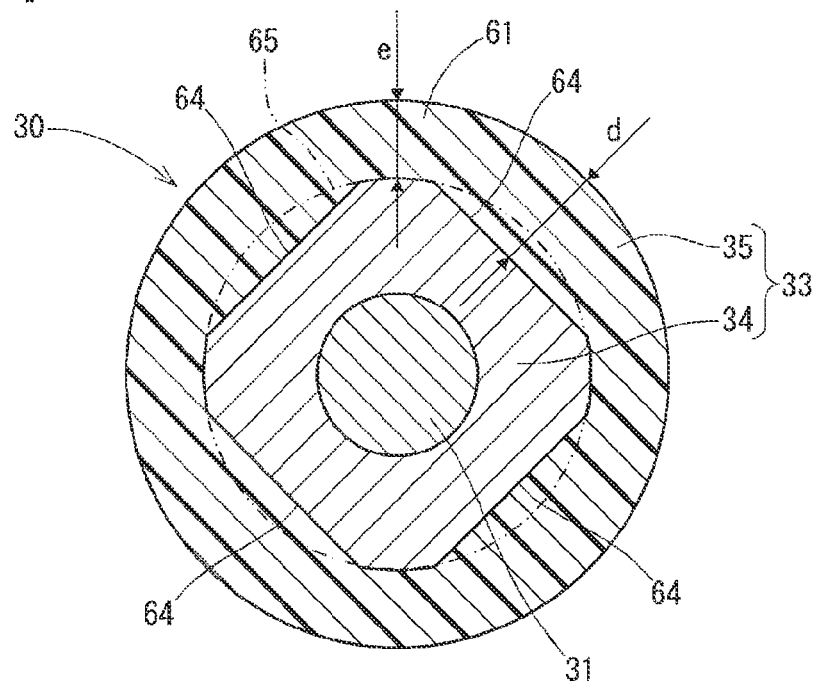
FIG. 4 is a IV-IV line cross section of FIG. 3.
Figure 5:
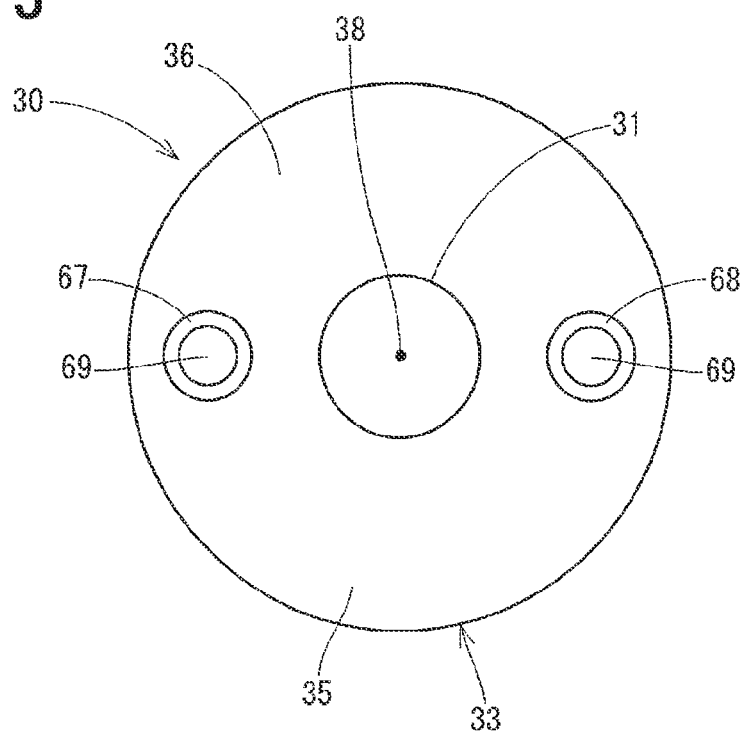
FIG. 5 is an illustration in an arrow V direction view of FIG. 3.

As shown in FIGS. 3-5, the permanent magnet 35 of the rotor 30 is a bonded magnet which is injection-molded by the mixed material of thermoplastics, such as PPS (i.e., a polyphenylene sulphide), and magnetic particles, and is attached onto an outer surface of the inner core 34 in a clinging manner. According to the present embodiment, the neodymium bonded magnet is adopted as the above-mentioned bonded magnet.

The permanent magnet 35 forms a cylinder part 61, a first end 62, and a second end 63. The cylinder part 61 is located on a radial outside of the inner core 34. The first end 62 is located on one side in an axial direction relative to the cylinder part 61 and the inner core 34. The second end 63 is located on the other side in an axial direction relative to the cylinder part 61 and the inner core 34. The first end 62 and the second end 63 are formed in a tabular shape so that a thickness direction of the first/second end 62, 63 is aligned with the axial direction of the cylinder part 61.

When a full length of the permanent magnet 35 along the axial direction is set to "a", a thickness of the first end 62 along the axial direction is set to "b" and a thickness of the second end 63 along the axial direction is set to "c", the permanent magnet 35 is formed so that following equations (1) and (2) are satisfied.

$$0.1 \leq (b/a) \leq 0.17 \quad (1)$$

$$0.1 \leq (c/a) \leq 0.17 \quad (2)$$

Figure 6:
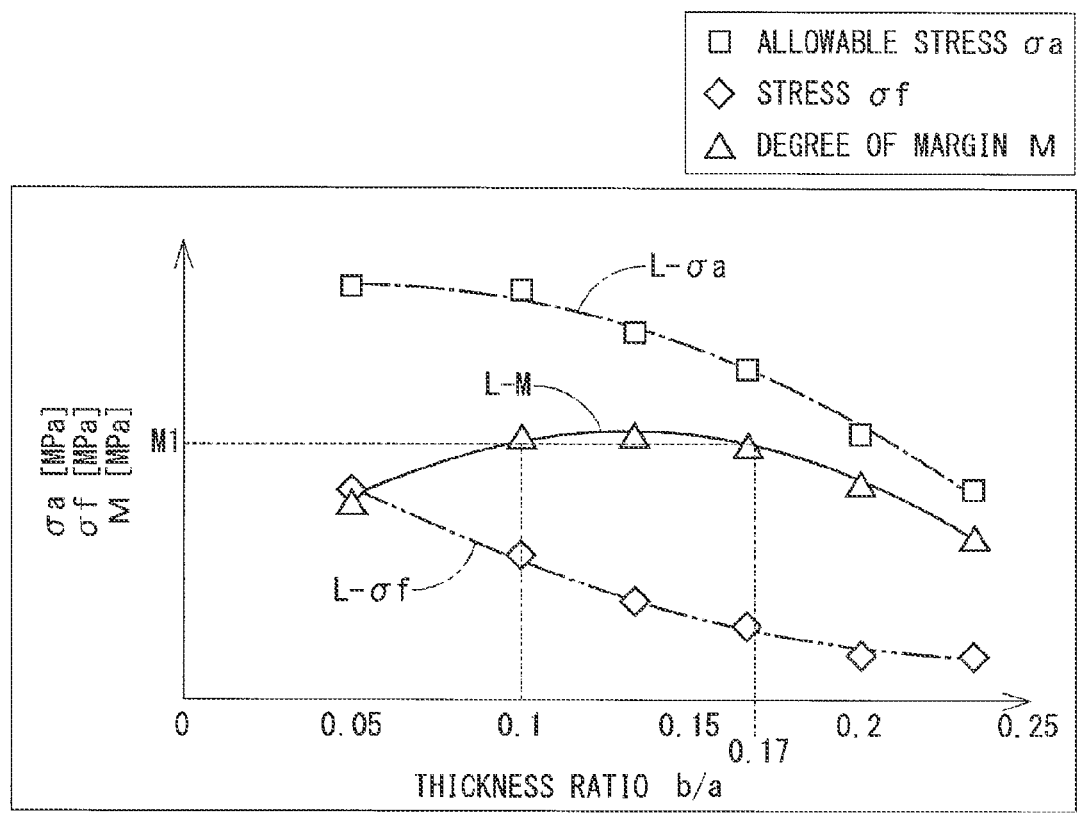
FIG. 6 is a line diagram of a relationship between various stresses of a permanent magnet and thickness ratios of the permanent magnet derived as a ratio of thickness of a first end against a full length of the permanent magnet of FIG. 3.
Figure 7:
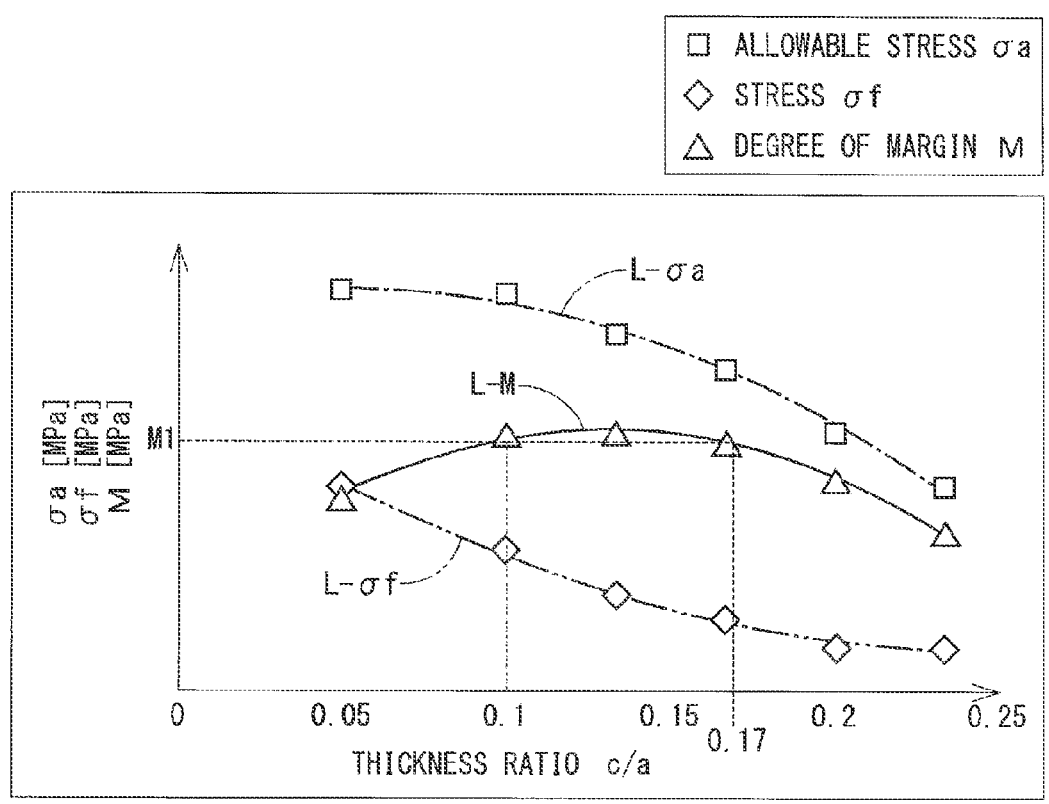
FIG. 7 is a line diagram of a relationship between various stresses of a permanent magnet and thickness ratios of the permanent magnet derived as a ratio of thickness of a second end against a full length of the permanent magnet of FIG. 3.

As indicated by a dashed-dotted line L-σa in FIG. 6, an allowable stress σa of the first end 62 of the permanent magnet 35 becomes small as a thickness ratio b/a becomes large. Further, as indicated by a two-dot chain line L-σf in FIG. 6, a stress σf applied onto the first end 62 of the permanent magnet 35 when the rotor core 33 expands and contracts due to a temperature change becomes small as a thickness ratio b/a becomes large.

In a section where the thickness ratio b/a is relatively small, the slope of the dashed-dotted line L-σa becomes small while the slope of the two-dot chain line L-σf becomes large, in comparison to a section where the thickness ratio b/a is relatively large. That is, the dashed-dotted line L-σa is a convex curve (i.e., is an upward curve), and the two-dot chain line L-σf is a concave curve (i.e., is a downward curve). Thereby, as indicated by a solid line L-M in FIG. 6, a degree M of margin which is a difference between the allowable stress σa and the stress σf becomes relatively large when the thickness ratio b/a satisfies the equation (1), and becomes equal to or greater than a predetermined value M1.

The same applies to a thickness ratio c/a. That is, as indicated by the dashed-dotted line L-σa in FIG. 7, the allowable stress σa of the second end 63 of the permanent magnet 35 becomes small as the thickness ratio c/a becomes large. Further, as indicated by the two-dot chain line L-σf in FIG. 7, the stress σf applied onto the second end 63 of the permanent magnet 35 becomes small when the rotor core 33 expands and contracts due to a temperature change becomes small as the thickness ratio c/a becomes large.

In a section where the thickness ratio c/a is relatively small, the slope of the dashed-dotted line L-σa becomes small while the slope of the two-dot chain line L-σf becomes large, in comparison to a section where the thickness ratio c/a is relatively large. That is, the dashed-dotted line L-σa is a convex curve (i.e., is an upward curve), and the two-dot chain line L-σf is a concave curve (i.e., a downward curve). Thereby, as indicated by the solid line L-M in FIG. 7, the degree M of margin which is a difference between the allowable stress σa and stress σf becomes relatively large when the thickness ratio c/a satisfies the equation (2), and becomes equal to or greater than the predetermined value M1.

As shown in FIG. 3, the full length "a" of the permanent magnet 35 is set to be equal to or greater than 18 [mm] from a performance viewpoint of the motor, and is set to be equal to or smaller than 30 [mm] from an ease-of-formation viewpoint. According to the present embodiment, the full length "a" is set to 29.5 [mm], for example.

The thickness "b" of the first end 62 of the permanent magnet 35 and the thickness "c" of the second end 63 are set to the same value. According to the present embodiment, the thickness "b" and the thickness "c" are set to 3 [mm], for example.

(Inner Core)

As shown in FIG. 4, a horizontal cross sectional shape (i.e., cross section perpendicular to the axial direction) of the inner core 34 is non-circular. According to the present embodiment, the inner core 34 has an outer planar face 64 at four positions along an outer circumference so that a horizontal cross sectional shape of the inner core 34 takes, substantially, a rectangular shape. That is, the inner core 34 is formed in a "concave" shape on four sides if we define a concave as receding from a virtual circle 65 being a circumscription of the inner core 34.

In the present embodiment, when the maximum thickness along a radial direction from the outer planar face 64 of the inner core 34 to an outer circumferential face of the permanent magnet is defined as "d", and the minimum thickness thereof is defined as "e", the maximum thickness "d" is a radial direction dimension from the outer planar face 64 to the outer circumferential face, and the minimum thickness "e" is a radial direction dimension from the virtual circle 65 to the outer planar face outer circumferential face. Thus, the inner core 34 is formed to satisfy a following equation (3).

$$d/e \geq 1.4 \tag{3}$$

(Gate Mark)

As shown in FIGS. 3 and 5, when an end face of the permanent magnets 35 close to the first end 62 in the axial direction is defined as a first end face 36, and other end face close to the second end 63 in the axial direction is defined as a second end face 37, holes 67 and 68 are formed (i.e., bored) on the first end face 36 of the permanent magnet 35. Further, at a bottom of each of the holes 67 and 68, a gate mark 69 is formed. That is, a gate on the die 70, which serves as an inlet for a flow of the mixed material for die forming of the permanent magnet 35, is positioned to face the bottom of each of the holes 67 and 63 in a matching manner, leaving the gate mark 69 corresponding to each of gates 78 mentioned below.

(Die Forming of the Permanent Magnet)

Figure 8:
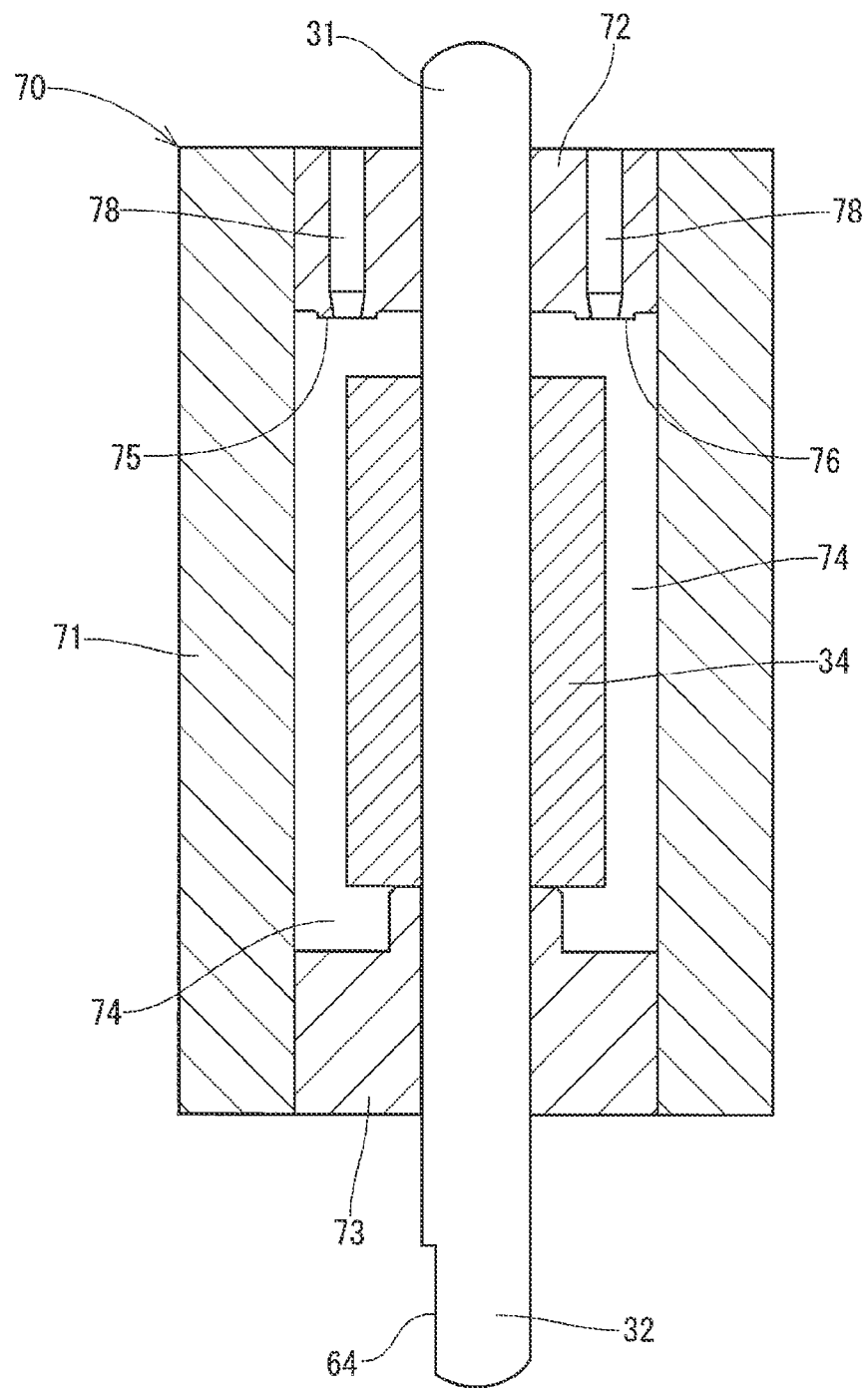
FIG. 8 is an illustration of a first formation step of the permanent magnet of FIG. 3.

When manufacturing the permanent magnet 35, an assembly of the shaft 31 and the inner core 34 is first installed in a die 70 as shown in FIG. 8.

The die 70 comprises a first die 71 in a cylinder shape, a second die 72 located on one end of the first die 71, and a third die 73 located on the other end of the first die 71. Projections 75 and 76 corresponding to the holes 67 and 68 are formed on a wall of a cavity 74 of the second die 72. The second die 72 has a gate 78 that opens on a tip side of the projections 75 and 76.

Figure 9:
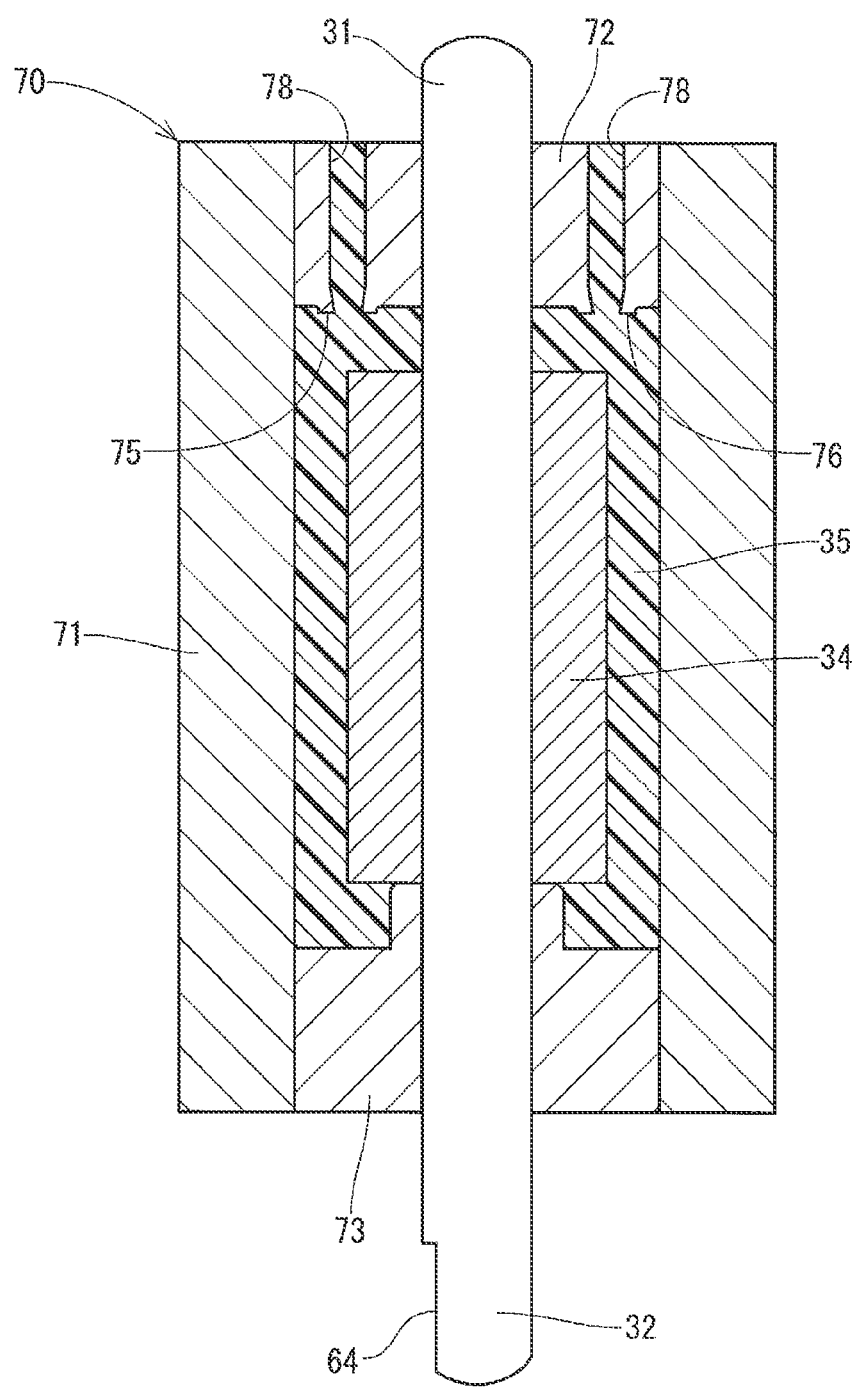
FIG. 9 is an illustration of a second formation step of the permanent magnet of FIG. 3.

Next, as shown in FIG. 9, the mixed material which is heat-melted is poured from the gate 78 of the second die 72. After the cavity 74 is filled up, cooling solidification of the mixed material is performed.

Figure 10:
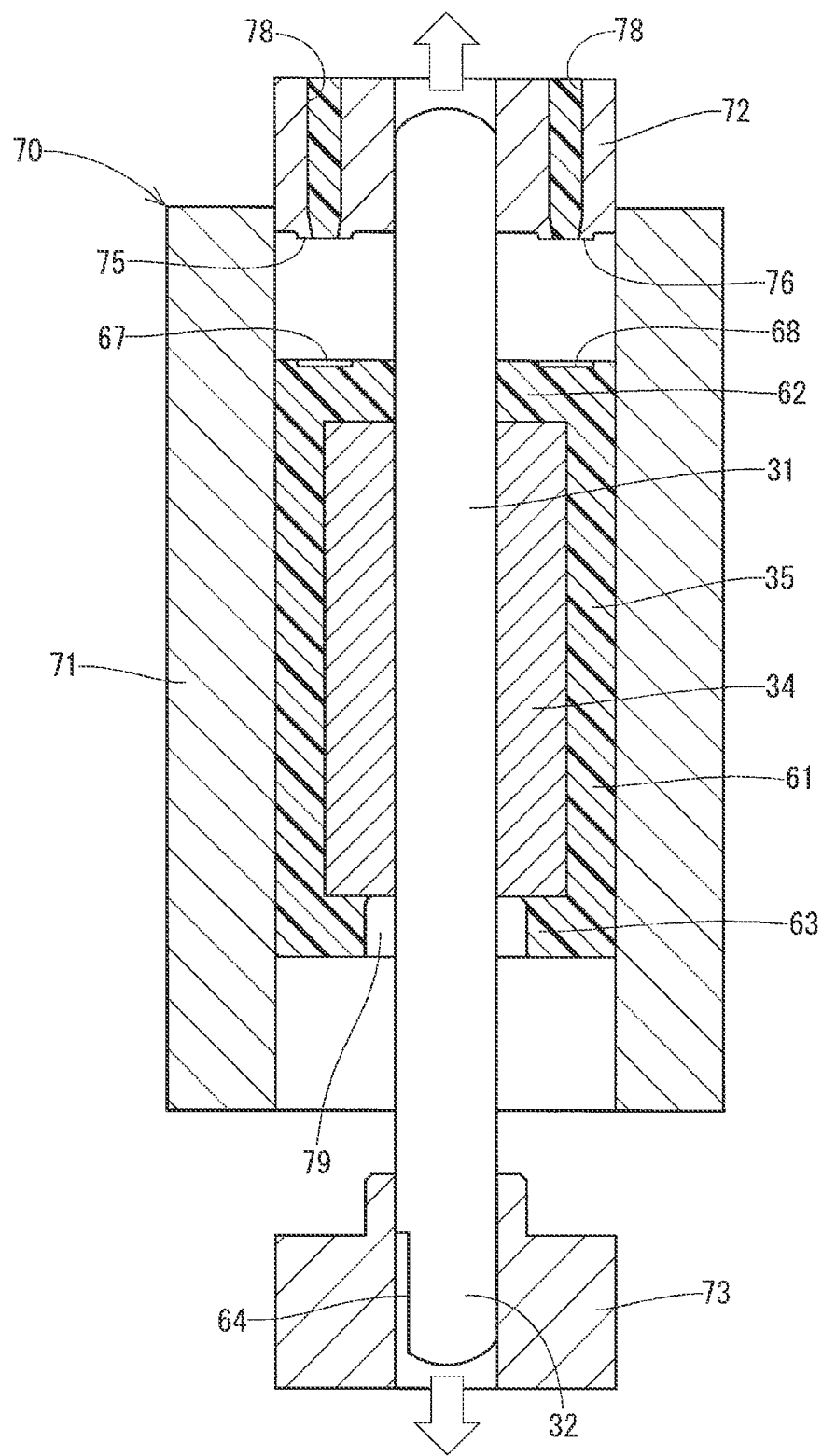
FIG. 10 is an illustration of a third formation step of the permanent magnet of FIG. 3.

Next, as shown in FIG. 10, the second die 72 and the third die 73 are pulled out from the first die 71. At a pull-out time, a surplus portion (e.g., a burr) solidified in the gate 78 is torn off from the product section solidified in the cavity 74.

Next, a jig which is not illustrated is inserted into a hole 79 that is opened on the second end face 37 of the permanent magnet 35, and the rotor 30 is removed from the first die 71 by the pressing of the jig on the inner core 34.

Next, the permanent magnet 35 is magnetized and the rotor 30 is completed.

As described above, in the present embodiment, the permanent magnet 35 has its thickness ratio b/a configured to be equal to or greater than 0.1 and configured to be equal to or smaller than 0.17 so that the degree M of margin which is a difference between (i) the allowable stress σa of the first end 62 and (ii) the stress σf becomes equal to or greater than the predetermined value M1.

Therefore, expansion and contraction of the rotor core 33 are repeated due to the temperature change, a crack on the first end 62 of the permanent magnet 35 is prevented.

Further, in the present embodiment, the permanent magnet 35 has its thickness ratio c/a configured to be equal to or greater than 0.1 and configured to be equal to or smaller than 0.17 so that the degree M of margin which is a difference between (i) the allowable stress σa of the second end 63 and (ii) the stress σf becomes large.

Therefore, expansion and contraction of the rotor core 33 are repeated due to the temperature change, a crack on the second end 63 of the permanent magnet 35 is prevented.

Here, even when the mixed material of resin and magnetic particles used to form the permanent magnet 35 is heat-melted, viscosity of such material is high and thermal conductivity of such material is large. Therefore, it takes time for two flows of the mixed material to meet at a merge point in the die 70, that is, a merge point of (i) one flow of the material from one of the gates 78 and (ii) other flow from other gate 78, and while flowing through the die 70, a large amount of heat is derived from those flows of material. Therefore, strength of the permanent magnet 35 at the merge point (i.e., a weld merge point) might be insufficient due to the temperature decrease of the mixed material at such a point.

On the other hand, in the present embodiment, the inner core 34 has the outer planar face 64 at four positions on the periphery, which makes the horizontal cross sectional shape of the inner core 34 to have a rectangular shape. Such a shape of the core 34 defines a large passage between the core 34 and the first die 74 when the core 34 is put in the die 70.

Therefore, the mixed material can smoothly flow through the above-mentioned large passage to reach the merge point. Thus, the temperature decrease of the mixed material at the weld merge point is reduced, and the reduction of strength of the permanent magnet 35 is prevented.

In the present embodiment, the maximum thickness "d" of in the radial direction of the inner core 34 is set to be equal to or greater than 1.4 times of the minimum thickness e.

Therefore, a relatively large passage is formed at a position between the outer planar face 64 of the inner core 34 and the first die 71.

Further, in one embodiment, the gate 78 which serves as an inlet of the mixed material at the time of the die forming of the permanent magnet 35 is positioned at the bottom of each of the holes 67 and 68 that is opened to the first end face 36 of the permanent magnet 35.

Therefore, the gate mark 69 is formed at the bottom of the holes 67 and 68, which prevents the gate mark 69 from interfering a flow of the fuel on an outside of the permanent magnet 35.

(Other Embodiments)

In other embodiments of the present disclosure, the thickness of the first end of the permanent magnet and the thickness of the second end of the permanent magnet may have different values.

In other embodiments of the present disclosure, the cross sectional shape of the inner core may be circular. Further, even when the cross sectional shape of the inner core is circular, the maximum thickness in the radial direction of the inner core may be smaller than 1.4 times of the minimum thickness.

In other embodiments of the present disclosure, the gate which serves as an inlet of the material for the die forming of the permanent magnet needs not be positioned on the end face in the axial direction of the permanent magnet.

In other embodiments of the present disclosure, the number of magnetic poles on the rotor may be other than four, and the number of slots on the stator may be other than six.

In other embodiments of the present disclosure, the inner core may be formed as a stack of magnetic steel plates stacked along the axial direction.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A rotor for a brushless motor which rotates an impeller of a fuel pump, the rotor comprising:
a shaft;
a single inner core fixed to the shaft; and
a permanent magnet, wherein the permanent magnet is a single bonded magnet of a resin material with magnetic particles and is formed by injection molding, the permanent magnet including
a cylinder part positioned radially outside of the single inner core,
a first end having a tabular shape and located on one axial end relative to the cylinder part and the single inner core, and
a second end having a tabular shape and located on an other axial end relative to the cylinder part and the single inner core, wherein
the permanent magnet has plural magnetic poles arranged around a circumference of the permanent magnet, and
when a full length of the permanent magnet along an axial direction is defined as "a" and a thickness of the first end of the permanent magnet along the axial direction is defined as "b" so that a ratio of b/a satisfies a condition where $0.1 \leq (b/a) \leq 0.17$.

2. The rotor in claim 1, wherein
when a thickness of the second end of the permanent magnet along the axial direction is defined as "c", the permanent magnet satisfies a condition $0.1 \leq (c/a) \leq 0.17$.

3. The rotor in claim 2, wherein
the thickness "b" of the first end of the permanent magnet is the same as the thickness "c" of the second end of the permanent magnet.

4. The rotor in claim 1, wherein
a cross sectional shape of the inner core perpendicular to the axial direction is non-circular.

5. The rotor in claim 4, wherein
when a maximum thickness along a radial direction between an outer planar face of the inner core and an outer circumferential face of the permanent magnet is defined as "d", and a minimum thickness thereof is defined as "e",
a condition $(d/e) \geq 1.4$ is satisfied.

6. The rotor in claim 1, wherein
a gate that serves as an inlet for material during the die-forming process of the permanent magnet is positioned on an end face of the permanent magnet in the axial direction.

7. The rotor in claim 1, wherein
b/a satisfying the condition where $0.1 \leq (b/a) \leq 0.17$ results in a difference between allowable stress and an applied stress being greater than or equal to a margin,
b/a being less than 0.1 results in a difference between the allowable stress and the applied stress being less than the margin, and
b/a being greater than 0.17 results in a difference between the allowable stress and the applied stress being less than the margin.

8. The rotor in claim 1, wherein
the condition $0.1 \leq (b/a) \leq 0.17$ includes a range of values where a difference between allowable stress and stress is greater than or equal to a predetermined value.

9. The rotor in claim 8, wherein
the predetermined value prevents cracking.

10. A rotor for a brushless motor which rotates an impeller of a fuel pump, the rotor comprising:
a shaft;
a single inner core fixed to the shaft; and
a permanent magnet, wherein the permanent magnet is a single bonded magnet of a thermoplastic material with magnetic particles and is formed by injection molding, the permanent magnet including a cylinder part positioned radially outside of the single inner core, a first end having a tabular shape and located on one axial end relative to the cylinder part and the single inner core, and a second end having a tabular shape and located on an other axial end relative to the cylinder part and the single inner core, wherein the permanent magnet has plural magnetic poles arranged around a circumference of the permanent magnet, and a full length of the permanent magnet along an axial direction is defined as "a", a thickness of the first end of the permanent magnet along the axial direction is defined as "b", and a ratio of b/a satisfies a condition where $0.1 \leq (b/a) \leq 0.17$.

11. The rotor in claim 10, wherein a thickness of the second end of the permanent magnet along the axial direction is defined as "c" and the permanent magnet satisfies a condition $0.1 \leq (c/a) \leq 0.17$.

12. The rotor in claim 11, wherein the thickness "b" of the first end of the permanent magnet is the same as the thickness "c" of the second end of the permanent magnet.

13. The rotor in claim 10, wherein a cross sectional shape of the inner core perpendicular to the axial direction is non-circular.

14. The rotor in claim 13, wherein a maximum thickness along a radial direction between an outer planar face of the inner core and an outer circumferential face of the permanent magnet is defined as "d", a minimum thickness is defined as "e", and a condition $(d/e) \geq 1.4$ is satisfied.

15. The rotor in claim 10, wherein a gate that serves as an inlet for material during a die-forming process of the permanent magnet is positioned on an end face of the permanent magnet in the axial direction.

16. The rotor in claim 10, wherein b/a satisfying the condition where $0.1 \leq (b/a) \leq 0.17$ results in a difference between allowable stress and an applied stress being greater than or equal to a margin, b/a being less than 0.1 results in a difference between the allowable stress and the applied stress being less than the margin, and b/a being greater than 0.17 results in a difference between the allowable stress and the applied stress being less than the margin.

17. The rotor in claim 10, wherein the condition $0.1 \leq (b/a) \leq 0.17$ includes a range of values where a difference between allowable stress and stress is greater than or equal to a predetermined value.

18. The rotor in claim 17, wherein the predetermined value prevents cracking.

19. The rotor in claim 7, wherein the applied stress is stress due to thermal expansion or contraction.

20. The rotor in claim 16, wherein the applied stress is stress due to thermal expansion or contraction.

* * * * *